United States Patent [19]
Hartley

[11] 4,182,368
[45] Jan. 8, 1980

[54] PRESSURE REGULATOR

[76] Inventor: E. Dale Hartley, 2700 Jalmia Dr., Los Angeles, Calif. 90046

[21] Appl. No.: 831,514

[22] Filed: Sep. 8, 1977

[51] Int. Cl.² ............................................. G05D 16/00
[52] U.S. Cl. ............................ 137/596.17; 137/596.1; 137/863; 251/DIG. 2
[58] Field of Search ................ 137/596.17, 596.1, 863; 251/DIG. 2

[56] References Cited

U.S. PATENT DOCUMENTS

| 2,784,740 | 3/1957 | Stageberg | 251/DIG. 2 X |
| 3,334,656 | 8/1967 | Boyle | 137/596.1 |
| 3,357,448 | 12/1967 | Martin | 137/501 |
| 3,973,582 | 8/1976 | Seibold | 251/DIG. 2 X |
| 3,994,314 | 11/1976 | Hartley | 137/596.17 |

Primary Examiner—Gerald A. Michalsky
Attorney, Agent, or Firm—Gordon L. Peterson

[57] ABSTRACT

A pressure regulator comprising a regulated pressure chamber and first and second conduits leading to the regulated pressure chamber. The first and second conduits are adapted to communicate with fluid at first and second pressures, respectively. Each of these conduits terminate in ports in the regulated pressure chamber. The ports are opened and closed by a resilient, metal valve strip. An actuator driven by a torque motor controls the valve strip.

17 Claims, 4 Drawing Figures

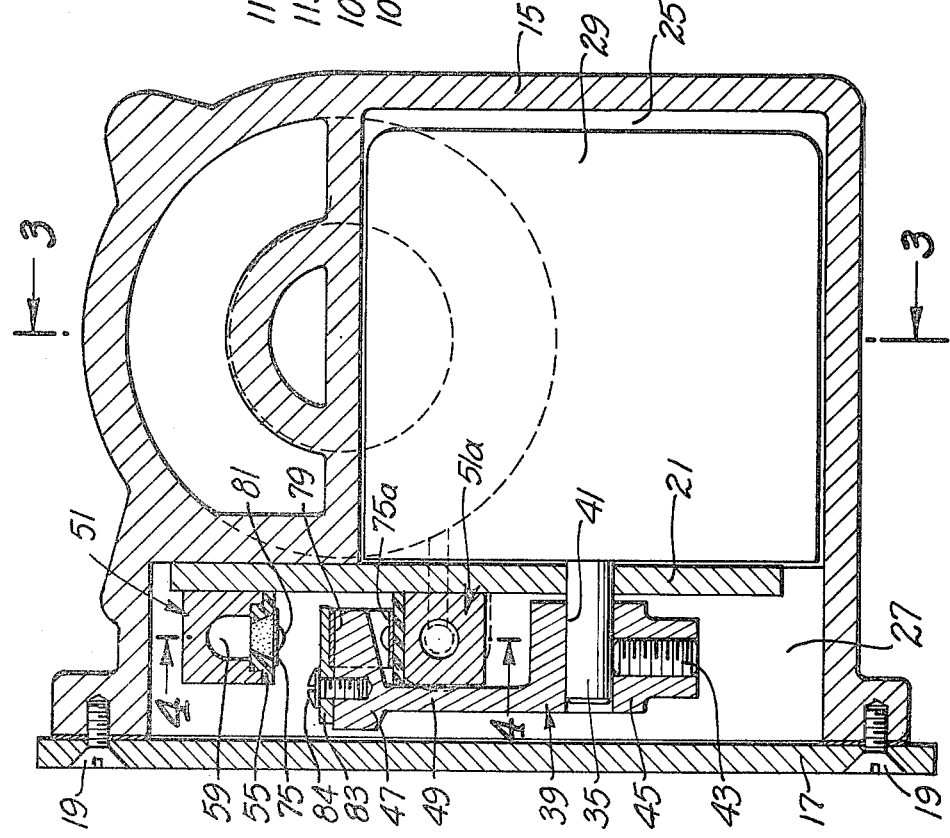

PRESSURE REGULATOR

BACKGROUND OF THE INVENTION

An air pressure regulator provides a fluid pressure output which varies with an input signal. Pressure regulators have many usages which require that the regulated pressure be very accurately controlled. One example is in the testing of pneumatic instruments, such as an air speed indicator, an altimeter, and a rate of descent meter for an aircraft. It is also necessary to test the systems in which these instruments are used. The test must accurately simulate the air pressure these instruments encounter during actual inflight conditions, and this requires that the air pressure regulator provide air pressure above and below ambient pressure.

One prior art system for pressure regulators utilizes two regulators, one for pressures above ambient and one for pressures below ambient. Each regulator uses a flexible, resilient valve strip folded between a swing arm and a port. By pivoting the swing arm, the valve strip is moved to progressively close or open the port. The differential pressure across the port tends to seat the valve strip against the surface surrounding the port.

The use of a folded valve strip is most effective in a pressure regulator. Unfortunately, the prior art system described above requires two of the regulators, and this substantially increases the cost and complexity of the system.

My U.S. Pat. No. 3,994,314 discloses a pressure regulator which solves the problems noted above. My prior pressure regulator utilizes two separate U-shaped valve strips constructed of rubber. The rubber strips are used to cover and uncover ports which communicate with sources of fluid at positive and negative pressures, respectively. These rubber strips must be relatively thick to provide sufficient force to tightly seal against the ports. Unfortunately, these relatively thick rubber strips have a high hysteresis, and accordingly, the regulator is not as accurate as it would be if the hysteresis were eliminated.

Secondly, bending of the relatively thick rubber strips places the interior of the curve in compression and the exterior of the curve in tension. This results in a groove or concavity being formed over at least a portion of the exterior surface of the rubber strip. This groove may cause leakage at some positions of the rubber strip.

SUMMARY OF THE INVENTION

The present invention represents a substantial improvement over the pressure regulator described in my U.S. Pat. No. 3,994,314. The present invention provides a pressure regulator having greater accuracy than was heretofore obtainable. This is accomplished, in part, by utilizing a valve strip that has substantially no hysteresis and which does not have irregularities in its outer surface which would permit leakage.

This is accomplished by utilizing a valve strip constructed of thin, resilient metal. The arrangement should be such that the valve strip has substantially no hysteresis and no stress-induced irregularities in its outer surface. For example, high carbon spring steel known as clock spring steel has been found very satisfactory for this purpose. However, it should be understood that any metal meeting the conditions noted above and which is bendable into a fairly tight curve without taking a permanent set can be used.

The allowable thickness of the metal will vary depending upon the radius of curvature required for the valve strip. However, it has been found that thicknesses ranging from about 0.0015 inch to about 0.0020 inch are optimum for at least some applications.

For improved sealing, it is preferred to use a relatively soft material, such as rubber for the metal valve strip to bear against. Accordingly, it is preferred to construct the valve seat against which the valve strip bears of a soft material, such as rubber. A relatively inert rubber which will not react with the metal of the valve strip is preferred. Silicone rubber is preferred for this reason.

In addition, it is desirable to coat the valve strip to make it inert and rust resistant. This further assures that the metal will not react with the rubber, and it avoids sticking of the metal on the rubber which might result due to chemical action. Although various inert materials can be utilized, gold is preferred because it can be applied in layers which are extremely thin, even in relation to the extremely thin spring steel strip.

The present invention makes other improvements over my patented pressure regulator. The present invention uses a single integral valve strip to open and close two ports, whereas my prior pressure regulator used two separate U-shaped valve strips to accomplish this purpose. Thus, the present invention teaches how a single valve strip can perform the functions heretofore performed by two valve strips.

This can be accomplished, for example, by using a valve strip which includes first and second end portions, an intermediate portion and first and second bend portions joining the first and second end portions, respectively, to the intermediate portion. For example, the resulting configuration may be generally in the form of an S or a reverse S. The valve strip is positioned between the ports in the regulated pressure chamber with the first and second end portions of the valve strip cooperating with the ports, respectively, to open and close such ports. The single valve strip is simpler, less expensive and easier to assemble than the two valve strips of the prior art.

One example of the simplification achieved by the single valve strip is that it must be attached only at a single location to the actuator which moves the valve strip. This attachment is preferably at the intermediate portion of the valve strip and can be advantageously accomplished by utilizing a plate for clamping the intermediate portion of the valve strip against the actuator. This single attachment and the use of a plate to accomplish the attachment are particularly advantageous because of the extremely thin, delicate nature of the valve strip.

Although the actuator may be moved along various different paths, in a preferred form of the invention, the actuator is in the form of a swing arm mounted for pivotal movement about a pivot axis.

Pressure regulators must be calibrated, and the present invention greatly simplifies the calibration mechanism disclosed in my prior patent. With this invention, the ports in the regulated pressure chamber are each provided in a port arm which is mounted for generally linear movement. This is a much simpler arrangement than the pivotally mounted port arms disclosed in my prior patent. In addition, the port arms are adjusted by the use of a single adjustment member, such as a screw and a spring. This is also a simplification over the multiple screw adjusting mechanism of my prior patent.

A differential pressure acts across the valve strip at each of the ports in the regulated pressure chamber. The regulated pressure in the regulated pressure chamber is higher than the pressure in the port which is coupled to negative pressure. Accordingly, this pressure differential tends to seat the valve strip against the valve seat. However, the differential pressure acting across the port which communicates with relatively high fluid pressure tends to unseat the valve strip. As explained in my prior patent, a pre-regulator is used to limit the pressure port to a magnitude which will not ordinarily unseat the valve strip from the high pressure port. However, the present invention employs additional features to guard against the unseating of the valve strip from the high pressure port.

With this invention, the valve strip and the actuator can be arranged so that movement of the actuator away from a neutral position tends to increase the spring force urging the valve seat against the pressure port. For example, this can be accomplished by locating the swing arm and the ports so that one of the ports lies between the pivot axis and the other of the ports. To assure that this configuration will provide the results desired, the valve seat for the high pressure port should be configured so that the valve strip seating force can be increased. Although various configurations are possible, preferably the valve seat, at least for the high pressure port, has a relatively flat region which may be perpendicular to the axis of the actuator in the neutral position.

The pre-regulator may be of various different configurations. In a preferred embodiment, the present invention provides a diaphragm-type pre-regulator in which the valve element of the pre-regulator is attached to the diaphragm without perforating the diaphragm. This substantially reduces the likelihood of leakage through the diaphragm.

The diaphragm of the pre-regulator communicates with the regulated pressure chamber and with the pressure of the fluid being admitted to the regulator. To damp out any rapid pressure fluctuations that may occur in the regulated pressure chamber, the diaphragm preferably communicates with the regulated pressure chamber through a restricted passage.

The invention can best be understood by reference to the following description taken in connection with the accompanying illustrative drawings.

BRIEF DESCRIPTION OF THE DRAWINGS

FIG. 2 is a sectional view taken generally along line 2—2 of FIG. 1.

FIG. 3 is a sectional view taken generally along line 3—3 of FIG. 2.

DESCRIPTION OF THE PREFERRED EMBODIMENT

Figure 1:
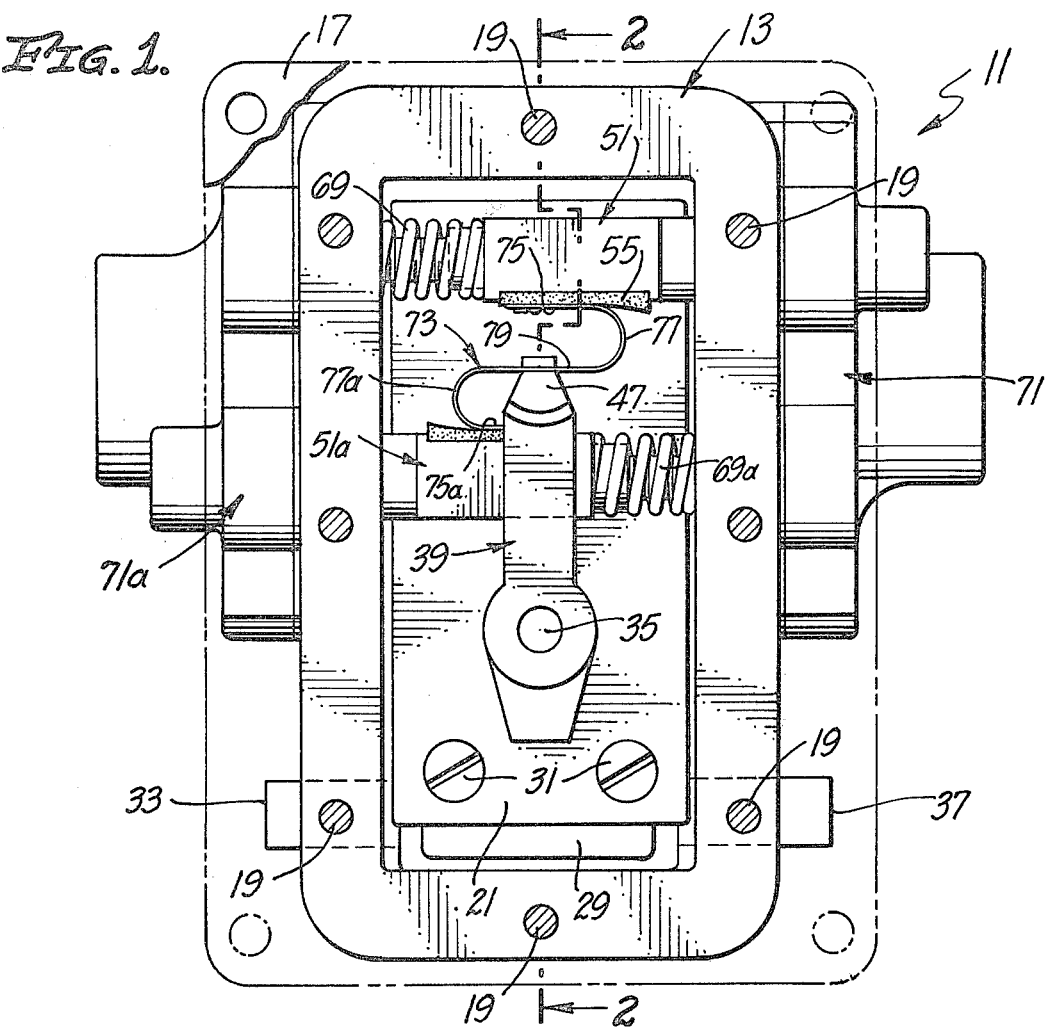
FIG. 1 is a plan view with the cover broken away of a pressure regulator constructed in accordance with the teachings of this invention.
Figure 4:
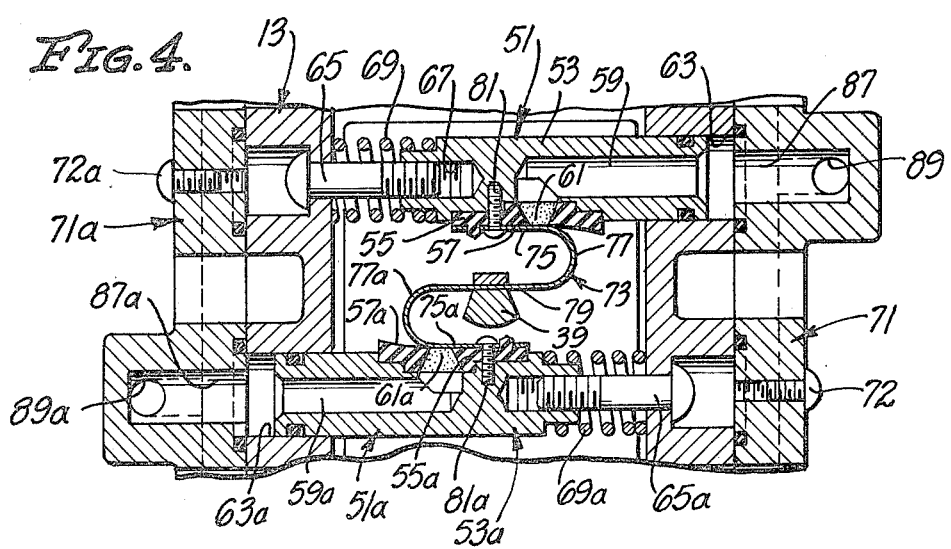
FIG. 4 is a fragmentary sectional view taken generally along line 4—4 of FIG. 2.

FIGS. 1-4 show a pressure regulator 11 which includes a supporting structure or housing 13. The housing 13, which may be of various different configurations, includes a body section 15 and a cover 17 (FIG. 2) suitably attached thereto as by screws 19.

A mounting plate 21 (FIGS. 1 and 2) is attached to the body section 15 in any suitable manner, such as by screws (not shown) to divide the interior of the housing into two compartments 25 and 27. A torque motor 29 is provided in the compartment 25 and is mounted on the mounting plate by a plurality of screws 31. The torque motor 29 is coupled to a terminal 33 (FIG. 1) which is adapted for connection to a controller (not shown) for providing an electrical input to the torque motor. The torque motor 29 has an output shaft 35 which projects through an opening in the mounting plate 21 into the compartment 27. The torque motor rotates or pivots the output shaft 35 about its longitudinal axis in accordance with the electrical input signal received via the terminal 33. The compartments 25 and 27 form a regulated pressure chamber. The compartment 25 has a regulated pressure outlet 37 (FIG. 1) which can be coupled to the device (not shown) which is to utilize the fluid at regulated pressure.

An actuator which, in the embodiment illustrated, is in the form of a swing arm 39 is mounted on and driven by the shaft 35. Although various constructions can be utilized, in the embodiment illustrated, the swing arm 39 has a bore 41 (FIG. 2) for receiving the output shaft 35, and a set screw 43 locks the swing arm in position on the output shaft. The longitudinal axis of the output shaft 35 defines a pivot axis for the swing arm 39 with such pivot axis being adjacent one end of the swing arm.

Although the swing arm 39 may be constructed in different ways, in the embodiment illustrated, it includes a boss 45 in which the bore 41 is formed, a nose 47, and a web 49 integrally joining the boss and the nose.

A pair of substantially identical port arms 51 and 51a are mounted for linear sliding movement along parallel paths, both of which lie perpendicular to the axis of the swing arm 39 in the neutral position. Portions of the port arm 51a and the mounting structure therefor corresponding to portions of the port arm 51 and the mounting structure therefor are designated by corresponding reference numerals followed by the letter "a."

The port arm 51 includes a tubular body 53 and a valve seat 55 constructed of silicone rubber suitably attached to the tubular body as by an adhesive. The valve seat 55 has an outer surface 57, and the tubular body 53 and the valve seat 55 have a passage 59 extending therethrough which terminates at a negative or low-pressure port 61 at the surface 57.

One wall of the housing 13 has a bore 63 for slidably receiving one end of the tubular body 53 and for defining a passage which communicates with one end of the passage 59. An adjusting screw 65 passes through the opposite wall of the housing 13 and is threadedly received in a threaded bore 67 formed at the opposite end of the tubular body 53. A coil compression spring 69 acts between the housing 13 and a shoulder on the tubular body 53 to urge the port arm 51 to the right as viewed in FIG. 4.

The bore 63 and the screw 65 cooperate to mount the port arm 51 for movement along a linear axis. The position of the port arm 51, and hence the position of the port 61, can be adjusted along the linear axis by rotating the screw 65.

The port arm 51a is mounted beneath the web 49 in an identical manner, except that the relative positions of the screw 65a and the bore 63a are reversed. Cover plates 71 and 71a carried by the housing 13 provide access to the adjusting screws 65 and 65a for the port arms 51 and 51a. However, screws 72 and 72a normally block this access.

An integral, resilient valve strip 73 is carried by the swing arm 39 and cooperates with the surfaces 57 and 57a to open and close the ports 61 and 61a. In the embodiment illustrated, the valve strip 73 is integrally constructed from a single piece of high carbon steel. The valve strip 73 has a thickness of about 0.0015 inch to about 0.0020 inch, and it has an extremely thin gold film thereon.

The valve strip 73 has relatively flat end portions 75 and 75a, reverse bend portions 77 and 77a, and a relatively planar intermediate portion 79 integrally joining the reverse bend portions. The valve strip 73 is generally in the form of a reverse S configuration.

The end portions 75 and 75a are fixedly attached to the port arms 51 and 51a, respectively, by screws 81 and 81a. The intermediate portion 79 is releasably attached to the outer end of the swing arm 39 by a plate 83 (FIG. 2) which is attached to the swing arm by a screw 84 and which clamps the intermediate portion 79 against the outer end of the swing arm 39.

The valve strip 73 may also be considered as comprising two U-shaped valve strip segments. The valve strip 73 resiliently urges its end portions 75 and 75a against the surface 57 and 57a, respectively. Pivotal movement of the swing arm 39 causes the valve strip 73 to roll to progressively open and/or close the ports 61 and 61a.

The ports 61 and 61a communicate, respectively, with pre-regulators 85 and 85a (FIG. 3). Although any suitable network of passages may be utilized to provide this communication, in the embodiment illustrated, the cover plate 71 has a horizontal passage 87 communicating with the port 61 via the passage 59, and a vertical passage 89 provides communication between the passage 87 and a chamber 91 (FIG. 3) of the pre-regulator 85. Cover plate 71 is suitably attached to the remainder of the housing 13 in any suitable manner, such as by screws (not shown).

The pre-regulator 85 includes an integral, imperforate diaphragm 93 having an annular enlarged seal 95 received in confronting annular grooves in the housing 13 and the cover plate 71 to provide a seal therebetween. The diaphragm 93 cooperates with the cover plate 71 to define the chamber 91, and it cooperates with other portions of the housing 13 to define a chamber 97. The chamber 97 is sealed, except for a small diameter orifice 99 which provides communication between the chamber 97 and compartment 25 which forms part of the regulated pressure chamber. The orifice 99 is sufficiently small to damp out any rapid pressure fluctuations that may occur in the regulated pressure chamber. For example, the orifice 99 may have a diameter of the order of 0.020 inch.

The pre-regulator 85 also includes a resilient, thin metal retainer plate 101 having openings therein which receive integral bosses 103 on the diaphragm 93. A valve element 105 in the form of a ball is attached to the plate 101 by a screw 107. An O-ring mounted on the cover plate 71 defines a valve seat 109. A coil compression spring 111 acts between the cover plate 71 and the plate 101 to normally urge the valve element 105 inwardly away from the valve seat 109 so as to normally tend to maintain the pre-regulator 85 open. The cover plate 71 defines a port 113 which is adapted to communicate with a source of air under a pressure less than atmospheric. The pre-regulator 85 also includes a second thin, resilient metal plate 115 having a central aperture which fits over a hollow central protrusion 117 of the diaphragm 93. The protrusion 117 houses the head of the screw 107. The plates 101 and 115 may be adhered to the diaphragm and/or frictionally retained by the bosses 103 and the protrusion 117, respectively.

The diaphragm 93 has an annular folded portion 119 which permits the diaphragm to flex axially. The diaphragm 93 serves to resiliently mount the valve element 105 on the housing 13, and this is accomplished without perforating the diaphragm by attaching the valve element to the plate 101 which is in turn attached to the diaphragm using the bosses 103 and/or an adhesive.

The cover plate 71a similarly includes passages 87a and 89a for providing communication from the pressure port 61a to a chamber 91a of the pre-regulator 85a. Except as expressly shown or described herein, the pre-regulators 85 and 85a are identical, and corresponding portions are designated by corresponding reference numerals followed by the letter "a."

The differences in the pre-regulators 85 and 85a are dictated by the fact that the pre-regulator 85a communicates with a source of air under greater than atmospheric pressure. One difference is that the ball of the valve element 105a lies outside the chamber 91a. In addition, the valve element 105a has a longer stem, and the stem is attached to the plate 101a by a nut 121 screwed onto the stem and cooperating with a shoulder 123 on the stem to clamp the plate 101a therebetween.

The spring 111a, like the spring 111, tends to maintain the valve element 105a off of the valve seat 109 to maintain the pre-regulator 85a open. However, to accomplish this, the spring 111a is positioned in the chamber 97a and engages the plate 115a to urge the diaphragm 93a outwardly.

Before using the pressure regulator 11, it must be adjusted to establish a null or neutral position. This is accomplished by utilizing the screws 65 and 65a to move the port arms 51 and 51a, respectively, to adjust the amounts that the ports 61 and 61a are open with the swing arm 39 in a neutral or intermediate position. Although the manner of obtaining the null position can be varied, one preferred way is to have an extremely small flow into the regulated pressure chamber through the port 61a and an identically small flow out of the port 61. By using accurate flow meters and adjusting the linear positions of the port arms 51 and 51a, this can be accomplished.

Assuming that the ports 113 and 113a are coupled to sources of air at less than and greater than ambient pressure, respectively, the pressure regulator 11 is ready for use. The torque motor 29 receives an input signal which corresponds to a particular desired fluid pressure which may be greater or less than ambient. The torque motor 29 positions the swing arm 39 in response to this input signal, and the swing arm in turn opens one of the ports 61 and 61a and correspondingly closes the other of these ports. This causes fluid under pressure to be supplied through the port 61a and/or fluid to be vented from the regulated pressure chamber out through the port 61 to obtain the desired pressure within the regulated pressure chamber. When the desired pressure is reached, it is maintained in response to an appropriate input signal by returning the swing arm 39 to null or neutral. The fluid at regulated pressure is supplied from the compartment 27 to the compartment 25 and then to the regulated pressure outlet 37.

During this period of operation, the pre-regulators 85 and 85a limit the differential pressure acting on the end portions 75 and 75a, respectively, of the valve strip 73 to less than a predetermined maximum. If the pressure drop exceeds this maximum, the valve element 105 or 105a, as the case may be, is closed until the pressure drop is reduced to within the allowable limits. Of course, the predetermined maximum pressure differential is less than the differential pressure necessary to unseat the valve strip 73.

The pre-regulators 85 and 85a control the pressure drop across the ports 61 and 61a, respectively. Specifically, the diaphragm 93 has one face in communication with the discharge side of the port 61 via the chamber 97, the orifice 99 and the compartments 25 and 27, and the other face in communication with the inlet side of the port 61 via the chamber 91, the passages 89, 87 and 59. In this manner, the diaphragm 93 senses the pressure drop across the port 61 and hence the differential pressure acting on the end portion 75 of the valve strip 73.

The spring 111 tends to hold the valve element 105 open. Thus, the strength of the spring 111 determines the allowable differential pressure which can act on the end portion 75 of the valve strip 73. Obviously, the allowable differential pressure can be selected for specific applications by those skilled in the art; however, in the embodiment illustrated, the allowed differential pressure is 1 p.s.i.

The pre-regulator 85a is similarly associated with the port 61a to control the pressure drop across the port 61a and the end portion 75a. A pre-regulator to control the pressure drop across the vacuum port 61 is not necessary to prevent the end portion 75 from being blown off of the vacuum port. However, use of a pre-regulator is desirable in order to provide the same response for the pressure port 61a and the vacuum port 61.

The port arm 51a lies intermediate the axis of rotation of the swing arm 39 and the port arm 51. If the swing arm 39 is pivoted counterclockwise, the intermediate portion 79 is moved to the left as viewed in FIG. 1 to progressively roll the valve strip 73 farther over the port 61a and unroll the valve strip from the port 61. This reduces the pressure in the regulated pressure chamber. If the swing arm 39 is pivoted in the opposite direction, the opposite results are obtained.

The resilient valve strip 73 acts like a spring to provide the seating force for seating the end portions 75 and 75a against the valve seats 55 and 55a, respectively. If the swing arm 39 is pivoted in either direction from its neutral position, it tightens the U-shaped configuration formed by the intermediate portion 79, the reverse bend portion 77a, and the end portion 75a. This increases the spring or seating force against the valve seat 55a and reduces the likelihood that the end portion 75a will be blown, due to an increased pressure differential, off of the valve seat 55a.

The same effect which increases the mechanical spring force against the valve seat 55a also tends to decrease the seating force against the valve seat 55. However, this is of no practical consequence because the pressure differential across the end portion 75 of the valve strip 73 acts in a direction tending to seat the valve strip against the valve seat.

Although an exemplary embodiment of the invention has been shown and described, many changes, modifications and substitutions may be made by one having ordinary skill in the art without necessarily departing from the spirit and scope of this invention.

I claim:

1. A pressure regulator comprising:
   means defining first and second surface portions;
   first means defining a first passage having a first port adapted to communicate with fluid at a first pressure and a second port terminating at said first surface portion;
   means defining a second passage having a first port adapted to communicate with fluid at a second pressure and a second port terminating in said second surface portion;
   an actuator;
   means for mounting the actuator for pivotal movement about a pivot axis, said actuator including a first arm extending radially outwardly from said pivot axis on one side of said pivot axis;
   said second ports being on said one side of said pivot axis and opening in generally opposite directions;
   valve strip means coupled to said first arm of said actuator on said one side of said pivot axis for opening and closing said second ports, said valve strip means being constructed of thin, resilient metal;
   said valve strip means including a first valve strip segment acting between the actuator and said first surface portion and a second valve strip segment acting between the actuator and said second surface portion, said valve strip segments being movable by movement of the actuator to cover and uncover said second ports;
   means defining a regulated pressure chamber communicable with said second ports whereby the amount that said second ports are open controls the pressure in said regulated pressure chamber; and
   regulator means for limiting the pressure drop across at least one of said second ports to a first magnitude.

2. A pressure regulator as defined in claim 1 wherein said valve strip means includes a strip of spring steel having a layer of gold thereon.

3. A pressure regulator as defined in claim 1 wherein said valve strip means includes a strip of resilient metal having a thickness of from about 0.0015 inch to about 0.0020 inch.

4. A pressure regulator as defined in claim 1 wherein said first means includes a valve seat of rubber defining the second port of said first means whereby the first valve strip segment cooperates with said rubber valve seat to open and close the second port of the first means.

5. A pressure regulator as defined in claim 4 wherein the rubber is silicone rubber.

6. A pressure regulator as defined in claim 1 wherein said valve strip means is integral and includes first and second end portions, an intermediate portion and first and second bend portions joining the first and second end portions, respectively, to said intermediate portion, said first and second end portions cooperating with said second ports, respectively.

7. A pressure regulator as defined in claim 1 wherein said first means includes a first port arm defining the second port of said first means, means for mounting the port arm for movement along a path, and means for fixing the port arm in any one of a plurality of positions along said path without moving the actuator whereby the flow through said second port of said first means can be adjusted for a given position of the actuator to calibrate the pressure regulator.

8. A pressure regulator as defined in claim 1 wherein said regulator means includes a diaphragm, means for providing communication between the opposite faces of the diaphragm and the opposite sides of the second port of said first means, respectively, and a valve element coupled to said diaphragm without perforating the diaphragm.

9. A pressure regulator as defined in claim 8 wherein said providing means includes a restricted passage between one face of said diaphragm and said regulated pressure chamber.

10. A pressure regulator as defined in claim 1 wherein the valve strip means provides a force which urges the first valve strip segment against the first surface portion and said pressure regulator includes means responsive to movement of the actuator out of a neutral position for increasing the force from the valve strip which urges the first valve strip segment against the first surface portion.

11. A pressure regulator as defined in claim 1 wherein said valve strip means lies entirely on said one side of said pivot axis.

12. A pressure regulator comprising:
means defining first and second surface portions;
first means defining a first passage having a first port adapted to communicate with fluid at a first pressure and a second port terminating at said first surface portion;
means defining a second passage having a first port adapted to communicate with fluid at a second pressure and a second port terminating in said second surface portion;
an actuator;
means for mounting the actuator for movement along a path; a resilient valve strip including first and second end portions, an intermediate portion, and first and second bend portions joining the first and second end portions, respectively, to said intermediate portion;
said valve strip being between said second ports with the first and second end portions thereof cooperating with said second ports, respectively;
means for attaching the actuator to the intermediate portion of the valve strip so that the valve strip is movable by the actuator to cover and uncover said second ports, said valve strip acting between a first location on said actuator and said first and second surface portions to resiliently urge the first and second end portions against the first and second surface portions, respectively;
said path being oriented such that movement of the actuator out of a neutral position in at least one direction along said path moves said first location closer to said first surface position to increase the force with which the valve strip resiliently urges the first end portion against the first surface portion; and
means defining a regulated pressure chamber communicable with said second ports whereby the amount that said second ports are open controls the pressure in said regulated pressure chamber.

13. A pressure regulator as defined in claim 12 wherein said attaching means includes a plate for clamping the intermediate portion of the valve strip against the actuator.

14. A pressure regulator comprising:
means defining first and second surface portions;
first means defining a first passage having a first port adapted to communicate with fluid at a first pressure and a second port terminating at said first surface portion;
means defining a second passage having a first port adapted to communicate with fluid at a second pressure and a second port terminating in said second surface portion;
an actuator;
means for mounting the actuator for movement;
a resilient valve strip including first and second end portions, an intermediate portion, and first and second bend portions joining the first and second end portions, respectively, to said intermediate portion;
said valve strip being between said second ports with the first and second end portions thereof cooperating with said second ports, respectively;
means for attaching the actuator to the intermediate portion of the valve strip so that the valve strip is movable by the actuator to cover and uncover said second ports, said valve strip resiliently urging the first and second end portions against the first and second surfaces, respectively;
means responsive to movement of the actuator out of a neutral position for increasing the force with which the valve strip resiliently urges the first end portion against the first surface;
means defining a regulated pressure chamber communicable with said second ports whereby the amount that said second ports are open controls the pressure in said regulated pressure chamber; and
said means for mounting said actuator pivotally mounting the actuator for movement about a pivot axis, one of said second ports being between said pivot axis and the other of said second ports.

15. A pressure regulator comprising:
means defining first and second surface portions;
first means defining a first passage having a first port adapted to communicate with fluid at a first pressure and a second port terminating at said first surface portion;
means defining a second passage having a first port adapted to communicate with fluid at a second pressure and a second port terminating in said second surface portion;
an actuator;
means for mounting the actuator for movement;
a resilient valve strip including first and second end portions, an intermediate portion, and first and second bend portions joining the first and second end portions, respectively, to said intermediate portion;
said valve strip being between said second ports with the first and second end portions thereof cooperating with said second ports, respectively;
means for attaching the actuator to the intermediate portion of the valve strip so that the valve strip is movable by the actuator to cover and uncover said second ports, said valve strip resiliently urging the first and second end portions against the first and second surfaces, respectively;
means responsive to movement of the actuator out of a neutral position for increasing the force with which the valve strip resiliently urges the first end portion against the first surface;
means defining a regulated pressure chamber communicable with said second ports whereby the amount that said second ports are open controls the pressure in said regulated pressure chamber;
said first means including a first port arm defining the second port of said first means, means for mounting the port arm for movement along a path, and means for fixing the port arm in any one of a plurality of positions along said path without moving the actuator whereby the flow through said second port of said first means can be adjusted for a given position of the actuator to calibrate the pressure regulator; and said path being generally linear and said port arm mounting means mounting the port arm for generally linear movement along a first axis along said path.

16. A pressure regulator as defined in claim 15 including spring means for urging said port arm for movement in one direction along said first axis and said fixing means includes a threaded member for adjustably fixing the port arm in any one of said plurality of positions along said first axis.

17. A pressure regulator comprising:

means defining first and second surface portions;

first means defining a first passage having a first port adapted to communicate with fluid at a first pressure and a second port terminating at said first surface portion;

means defining a second passage having a first port adapted to communicate with fluid at a second pressure and a second port terminating in said second surface portion;

an actuator;

means for mounting the actuator for movement;

valve strip means cooperable with said actuator for opening and closing said second ports, said valve strip means being constructed of thin, resilient metal;

said valve strip means including a first valve strip segment acting between the actuator and said first surface portion and a second valve strip segment acting between the actuator and said second surface portion, said valve strip segments being movable by movement of the actuator to cover and uncover said second ports;

means defining a regulated pressure chamber communicable with said second ports whereby the amount that said second ports are open controls the pressure in said regulated pressure chamber;

regulator means for limiting the pressure drop across at least one of said second ports to a first magnitude; and said valve strip means includes first and second end portions, an intermediate portion and first and second bend portions joining the first and second end portions, respectively, to said intermediate portion, said valve strip means being between said second ports with the first and second end portions thereof cooperating with said second ports, respectively, said mounting means mounts the actuator for pivotal movement about a pivot axis, one of said second ports being between said pivot axis and the other of said second ports, said first means includes a port arm, means for mounting the port arm for movement along a path, and means for fixing the port arm in any one of a plurality of positions along said path without moving the actuator whereby the flow through the second port of said first means can be adjusted for a given position of the actuator to calibrate the pressure regulator.

* * * * *